(12) United States Patent
Lowe (10) Patent No.: US 10,632,981 B2
(45) Date of Patent: Apr. 28, 2020

(54) AUTOMATIC BRAKING SYSTEM (71) Applicant: Thomas Jeffrey Lowe, Huntington (GB)

(72) Inventor: Thomas Jeffrey Lowe, Huntington (GB)

( * ) Notice: Subject to any disclaimer, the term of this patent is extended or adjusted under 35 U.S.C. 154(b) by 0 days.

(21) Appl. No.: 15/961,656

(22) Filed: Apr. 24, 2018

(65) Prior Publication Data
US 2019/0001947 A1 Jan. 3, 2019

Related U.S. Application Data (60) Provisional application No. 62/500,396, filed on May 2, 2017.

(51) Int. Cl.
B60T 13/68 (2006.01)
B60T 7/22 (2006.01)
G08G 1/16 (2006.01)
G01S 13/86 (2006.01)
B60T 7/20 (2006.01)
G01S 13/93 (2020.01)

(52) U.S. Cl.
CPC .............. B60T 13/683 (2013.01); B60T 7/20 (2013.01); B60T 7/22 (2013.01); G01S 13/862 (2013.01); G01S 13/867 (2013.01); G08G 1/166 (2013.01); B60G 2400/823 (2013.01); B60T 2201/024 (2013.01); B60W 2550/10 (2013.01); B60Y 2200/14 (2013.01); G01S 2013/9346 (2013.01)

(58) Field of Classification Search
CPC . B60T 13/683; B60T 7/20; B60T 7/22; B60T 2201/024; G01S 13/867; G01S 13/862; G01S 2013/9346; G08G 1/166; B60G 2400/823; B60W 2550/10; B60Y 2200/14
See application file for complete search history.

(56) References Cited

U.S. PATENT DOCUMENTS

| 5,101,927 | A | 4/1992 | Murtuza |
| 2001/0052434 | A1 | 12/2001 | Ehrlich et al. |
| 2003/0111902 | A1 | 6/2003 | Thiede et al. |
| 2007/0132563 | A1 | 6/2007 | Balbale et al. |
| 2013/0062933 | A1* | 3/2013 | Daher .................... B60T 7/042 303/10 |

FOREIGN PATENT DOCUMENTS

| GB | 2347471 A | 9/2000 |
| GB | 2453523 B | 9/2011 |
| WO | 2015160265 A1 | 4/2015 |

* cited by examiner

Primary Examiner — Yuen Wong
(74) Attorney, Agent, or Firm — Stout, Uxa & Buyan, LLP; Donald E. Stout (57) ABSTRACT An automatic braking system including: a control unit for controlling at least some of the brakes of a vehicle; and a contact sensor for detecting an impact.

25 Claims, 3 Drawing Sheets

AUTOMATIC BRAKING SYSTEM

FIELD OF THE INVENTION

The present invention relates generally to automatic braking systems, and, in particular, to automatic braking systems to be installed in roadwork vehicles, such as, for example, lane closure vehicles.

BACKGROUND

Many trucks and commercial vehicles have service brakes which are engaged by air (pneumatic) pressure. Usually, all of the wheels of the vehicle will carry a brake which responds to pressurised air delivered along a supply line controlled by a foot pedal. The harder the foot pedal is depressed the greater the quantity of pressurised air supplied and the harder the brakes are applied.

In addition, the vehicle will have a parking brake which is engaged by a mechanical spring which acts in opposition to a pneumatic cylinder. Air pressure within the pneumatic cylinder acts to hold the parking brake in its disengaged position, whilst release of the air pressure allows the mechanical spring to engage the parking brake. Typically, the parking brake will operate upon the wheels of the rear axle of a vehicle.

In certain situations it is desired to have an automatic means of engaging the brakes of the vehicle in addition to the foot pedal or parking brake lever/pedal/switch. One example of such a situation is on a lane closure vehicle.

A lane closure vehicle is a vehicle, often a truck, which is used for the temporary closure of a lane of a road. Typically, the lane closure vehicle will carry a large arrow which directs following traffic to move out of the lane occupied by the vehicle. The vehicle may be stationary, or may move slowly along the roadway, and is generally implemented to protect road workers who may be working in or adjacent to that lane of the roadway.

While lane closure vehicles have flashing lights to alert drivers of their presence, it is possible that a driver on the road may fail to notice a lane closure vehicle before is too late to brake or to take avoiding action. The relative speed between lane closure vehicles and nearby traffic is typically large, and therefore any impact between traffic and lane closure vehicles is usually very damaging to the vehicles and their occupants. As such, most lane closure vehicles include a large deformable "cushion" (i.e. impact attenuator) at their rear, which can absorb an impact in the event a vehicle does drive into them.

Lane closure vehicles may also include an automatic braking system in addition to standard brakes. The automatic braking system activates the lane closure vehicle's brakes in the event that another vehicle drives into the lane closure vehicle. Thus, if the lane closure vehicle is moving slowly along the lane at the moment of impact and the driver is unable immediately to apply the service brakes or parking brake, the automatic braking system applies the lane closure vehicle's brakes so that the lane closure vehicle is prevented from causing a secondary accident, perhaps by being pushed into a road worker or further vehicle. One example of such a system is described in UK Patent No. 2453523.

The present invention seeks to provide an improved automatic braking system.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

In one broad form the present invention provides an automatic braking system including: a control unit for controlling at least some of the brakes of a vehicle; and a contact sensor for detecting an impact.

In one form, the control unit is configured to engage the brakes when an impact is detected.

In one form, the automatic braking system is configured to be deactivated under certain conditions.

In one form, the contact sensor is configured to be secured to an impact attenuator that is movable between a stowed position and a deployed position, and wherein the automatic braking system is deactivated when the attenuator is in the stowed position.

In one form, the automatic braking system further includes a proximity sensor to detect movement of the impact attenuator between the stowed position and the deployed position.

In one form, the impact attenuator is mounted to a trailer coupled to the vehicle.

In one form, the contact sensor includes anyone or a combination of a carbon contact strip a pressure sensor and/or a gyroscopic accelerometer.

In one form, the automatic braking further includes a speed sensor for detecting the speed of the vehicle;

In one form, the automatic braking system is deactivated when the speed of the vehicle is above a predefined value.

In one form, the automatic braking system further includes a remote sensor for detecting on- or more parameters associated with determining the potential for impact with an object.

In one form, the remote sensor includes anyone or a combination of a radar sensor, a stereo camera module, a laser sensor, a gyroscopic accelerometer and/or an ultrasound sensor.

In one form, the control unit controls the brakes based on one or more signals received from the remote sensor and/or the contact sensor.

In one form, the probability of an impact is determined based on one or more parameters of an object as detected by the remote sensor.

In one form, the probability of an impact is determined based on the distance, direction and/or speed of an object.

In one form, the control unit is configured to engage the brakes when the probability of an impact is above a threshold value.

In one form, the automatic braking system further includes an alert system.

In one form, the alert system includes an audible alarm and/or warning lights.

In one form, the alert system is activated when the probability of an impact is above a threshold value.

In one form, the alert system includes anyone or a combination of an audible alarm, integration with the vehicle horn and/or flashings lights.

In one form, the automatic braking system further includes a near-range sensor for detecting a nearby object.

In one form, the near-range sensor includes any one or a combination of an ultrasound sensor, an infrared sensor, an inductive sensor, a laser sensor, an electromagnetic sensor and/or a proximity sensor.

In one form, the control unit is configured to engage the brakes of the vehicle when an object is within a predetermined distance of the near-range sensor.

In one form, the automatic braking system further includes a mass sensor for detecting the mass of the vehicle.

In one form, engagement of the brakes is modulated based on the vehicle mass.

In one form, engagement of the brakes is modulated based on a combination of the vehicle mass and the distance of a nearby object as determined by the near-range sensor.

In one form, the braking system is configured to be connected to a manually operated parking brake lever of the vehicle, and wherein the system is configured such that after the system has engaged the brakes of the vehicle, the brakes cannot be disengaged until the parking brake lever has been cycled.

In one form, cycling the parking brake lever includes moving the lever to the engaged position for at least a pre-determined time period and then returning it to the disengaged position.

In one form, the pre-determined time period is 2 seconds.

In one form, the automatic braking system is configured to be connected to a manually operated activation switch, and wherein" the system is configured such that after the system has engaged the brakes of the vehicle, the brakes cannot be disengaged until the activation switch has been toggled.

In a further broad form, the present invention provides a vehicle including the automatic braking system as described in anyone of the forms herein.

In one form, the vehicle is a lane closure vehicle.

In one form, the vehicle includes a first brake means that is biased towards the disengaged state and a second brake means that is biased towards the engaged state, wherein the first brake means and the second brake means are engaged by the automatic braking system when an impact is detected.

In one form, the second brake is a parking brake.

In one form, the first brake means includes a pneumatically-operated brake having a first pneumatic cylinder connected to a pressurised air supply whereby the supply of air activates the brake, and the second brake means includes a spring-actuated brake having a second pneumatic cylinder connected to a pressurised air supply whereby the supply of air opposes the spring and deactivates the brake, wherein a first valve is connected to the pressurised air supply for the first brake means and a second valve is connected to the pressurized air supply for the second brake means, the system being configured to engage the brakes by issuing a signal to the first valve and to the second valve, to thereby supply pressurised air to the first pneumatic cylinder and exhaust air from the second pneumatic cylinder.

In a further broad form, the present invention provides an impact attenuator including an automatic brake system as described in anyone of the forms herein.

In one form, the automatic braking system as described in anyone of the forms herein is provided as all or part of a retrofit kit.

In a further broad form, the present invention provides a kit including a speed sensor to detect the speed of a vehicle 'configured to be used with an automatic braking system as described in anyone of the forms herein.

In a further broad form, the present invention provides a kit including a proximity sensor to detect movement of an impact attenuator between a stowed and a deployed position configured to be used with an automatic braking system as described in anyone of the forms herein.

In a further broad form, the present invention provides an automatic braking system including: a control unit for controlling at least some of the brakes of a vehicle; and at least one sensor connected to the control unit for detecting an impact, imminent impact and/or potential impact with an object, wherein the control unit controls the brakes based on one or more signals received from the at least one sensor.

In one form, the control unit is further configured to control the drive speed of the vehicle.

In one form, the control unit is configured to control the drive speed of the vehicle via control of the throttle.

In one form, the at least one sensor includes any one or a combination of a contact sensor, a remote sensor, or a near-range sensor.

In one form, the automatic braking system further includes a speed sensor for detecting the speed of the vehicle.

In one form, the automatic braking system is deactivated when the speed of the vehicle is above a predefined value.

BRIEF DESCRIPTION OF FIGURES

Example embodiments should become apparent from the following description, which is given by way of example only, of at least one preferred but nonlimiting embodiment, described in connection with the accompanying figures, wherein.

DETAILED DESCRIPTION

The following modes, given by way of example only, are described in order to provide a more precise understanding of the subject matter of a preferred embodiment or embodiments.

Embodiments of the present invention provide an automatic braking system that includes a control unit for controlling at least some of the brakes of a vehicle, and a contact sensor for detecting an impact. Generally, the control unit is configured to engage the brakes when an impact is detected by the contact sensor.

It will be appreciated that the control unit generally includes and electronic processing device such as, for example, a microcontroller, microprocessor or other suitably programmed electronic processing device. Typically the automatic braking system is retrofitted to existing vehicle/impact attenuators, however it will be appreciated that vehicles/impact attenuators may be produced which the system incorporated therein. Generally speaking, the control unit is typically configured to engage the brakes on the vehicle based on signals received from the contact sensor, which is usually placed on the impact attenuator.

The automatic braking system as described herein looks to improve safety measures associated with the use of road work vehicles, such as lane closure vehicles, which often move slowly or remain stopped at the side of the road for long periods of time. Once installed, the basic operation of the system is to engage the brakes when sufficient impact detected by the contact sensor. This helps to minimise any unwanted movement of the vehicle caused by an impact/collision. Whilst particularly suitable for road work vehicles, it will be appreciated that the automatic braking system as described herein is not limited to these types of vehicles and may be installed on other types of vehicles. The system is typically installed on vehicles which are coupled with impact attenuators (e.g. attenuator cushions), and the contact sensor positioned on the impact attenuator. When there is an impact, the attenuator dampens the impact whilst the automatic braking system engages the brakes of the vehicle. Apart from stopping the vehicle moving, the automatic braking system also allows the attenuator to work more effectively, as one the vehicle brakes have been applied, the attenuator cushion can more effectively crumple.

The presently described automatic braking system is particularly advantageous over existing systems in that it may be also configured to be deactivated under certain conditions. For example, the contact sensor may be configured to be secured to an impact attenuator that is movable between a stowed position and a deployed position, and, when the attenuator moves to the stowed position, the automatic braking system is configured to be deactivated (or depowered). This deactivation functionality provides significant safety advantages in that the brakes cannot be accidently engaged when the attenuator (typically on impact cushion or the like) is stowed, such as, for example, whilst the host vehicle is in transit. Generally to provide such functionality, the system includes a proximity sensor to detect movement of the impact attenuator between the stowed position and the deployed position. The system deactivating/reactivating (or powering/depowering), based on feedback to the control unit from the proximity sensor. It will be appreciated that other methods may be used to detect movement of the impact attenuator.

It will also be appreciated that the impact attenuator itself may take a variety of forms but is typically mounted to a trailer coupled to the host vehicle. The contact sensor, which is generally configured to be mounted to the attenuator, can also take a variety of forms, although generally includes anyone or a combination of: a carbon contact strip; a pressure sensor; and a gyroscopic accelerometer.

As a further safety feature, the automatic braking system may also include a speed sensor or may be configured/wired such that it is able to detect the speed of the host vehicle to which it is installed (for example control unit may have input/output connection to receive speed information). This allows the system to be activated/deactivated based on the host vehicle speed. In one particular example, the system may be deactivated when the speed of the vehicle is above a predefined value. Again, this particular setting helps to prevent accidental engagement of the brakes when the system is travelling at speed, such as, for example, during in transit between work sites.

Apart from a contact sensor, to detect actual impacts, the system may also include a remote (or long range) sensor to detect potential or imminent impacts from objects remote or distant from the vehicle, such as, for example, vehicles from nearby traffic. Generally, the remote sensor may include anyone or a combination of a radar sensor, a stereo camera module, a laser sensor, a gyroscopic accelerometer, and/or an ultrasound sensor. The remote sensor would typically be configured to detect one or more parameters associated with determining the potential for impact with an object. The system (e.g. via the control unit) may then determine the probability of an impact based the one or more parameters detected by the remote sensor. For example, the probability of an impact may be determined based on the distance, direction and/or speed of an object. The control unit typically being configured to engage the brakes when the probability of an impact is "above a threshold value. It will be appreciated that, in some forms, the system may include a plurality of remote sensors.

It will be appreciated that, generally speaking, the control unit may be configured to control/apply the brakes of the vehicle based on one or more signals received from the remote sensor and/or the contact sensor.

The automatic braking system may also include an alert system connected to the control unit, or the control unit may include connection (e.g. input/output) for an existing vehicle alert system such as for integration with the vehicle horn or theft alarm. The alert system may for example include an audible alarm and/or warning lights. The alert system is typically configured to activate when an imminent impact is detected, flashing warning lights and/or sounding an alarm. The alert system thereby alerting workers of a potential impact and allowing them sufficient time to escape harms way. The alert system may, for example, be activated when the probability of an impact is above a threshold value. It will be appreciated that the alert system may take a variety of forms but generally would include anyone or a combination of an audio speaker, integration with the vehicle horn, lights (e.g. LED's etc.).

The automatic braking system may also include a near-range sensor for detecting nearby objects. The near-range sensor may, for example, include anyone or a combination of an ultrasound sensor, an infrared sensor, an inductive sensor, a laser sensor, an electromagnetic sensor, and a proximity sensor. The control unit being appropriately configured to engage the brakes of the vehicle when an object is within a predetermined distance of the near-range sensor. It will be appreciated that the system may include a plurality of near-range sensors. The inclusion of a near-range sensor can be particularly advantageous in situations where manoeuvring movement of the vehicle is required, such as when reversing.

In some examples, the system may also include a mass sensor for detecting the mass of the vehicle (e.g. with or without cargo occupants). With the mass of the vehicle known, engagement of the brakes may controlled or modulated such that the brakes are applied in a manner that does not cause damage to the vehicle or occupants/cargo travelling therein. Engagement of the brakes may also be modulated or controlled based on a combination of the vehicle weight and the distance of a nearby object as determined by a near-range sensor. For example, the control unit may be configured to calculate, based on the stopping distance available (as received from the near-range sensor), the minimum braking force that may be applied to stop the vehicle in time, taking into account the mass of the vehicle.

As yet a further safety measure, once the automatic braking system has engaged the brakes of the vehicle, it may be configured such that the brakes cannot be disengaged without following a particular disengagement procedure (or a reset or reactivation procedure).

For example, the automatic braking system may be configured to be connected to a manually operated parking brake lever of the vehicle, with the brakes unable to be disengaged until the parking brake lever has been cycled. Cycling the parking brake lever may, for example, include moving the lever to the engaged position for at least a predetermined time period (e.g. 2 seconds) and then returning it to the disengaged position.

Alternatively or additionally, the braking system may be configured to be connected to a manually operated activation switch, wherein the brakes cannot be disengaged until the activation switch has been toggled.

It will be appreciated that the entire system may be depowered once the brakes are engaged, and only after following a reactivation procedure is the system repowered such that the brakes can be disengaged. Alternatively, the control unit may be suitably programmed to prevent disengagement of the brakes until a reactivation procedure is followed.

Although the automatic braking system herein is typically installed onto existing vehicles or existing vehicle/impact attenuator combinations, it will be appreciated that present invention may be provided in the form of a vehicle or vehicle/impact attenuator combination which include the automatic braking system. It will also be appreciated that the automatic braking system may be fitted to or provided as part of impact attenuator alone to subsequently be connected with a host vehicle. It will also be appreciated that the automatic braking system may be provided as a retrofit kit.

The automatic braking system is commonly used on lane closure vehicles, which generally have a first brake means that is biased towards the disengaged state and a second brake means that is biased towards the engaged state. The first brake means and the second brake means are engaged by the automatic braking system when an impact (or an imminent impact) is detected. The second brake means may, for example be a parking brake.

In one particular example, the first brake means includes a pneumatically operated brake having a first pneumatic cylinder connected to a pressurised air supply whereby the supply of air activates the brake, and the second brake means includes a spring-actuated brake having a second pneumatic cylinder connected to a pressurised air supply whereby the supply of air opposes the spring and deactivates the brake, wherein a first valve is connected to the pressurised air supply for the first brake means and a second valve is connected to the pressurised air supply for the second brake means, the system being configured to engage the brakes by issuing a signal to the first valve and to the second valve, to thereby supply pressurised air to the first pneumatic cylinder and exhaust air from the second pneumatic cylinder.

It will be appreciated that the automatic braking system may be used with various brake arrangements which may, for example, be pneumatically or hydraulically powered.

Particular examples, of the braking system are now described with reference to the figures.

Figure 1:
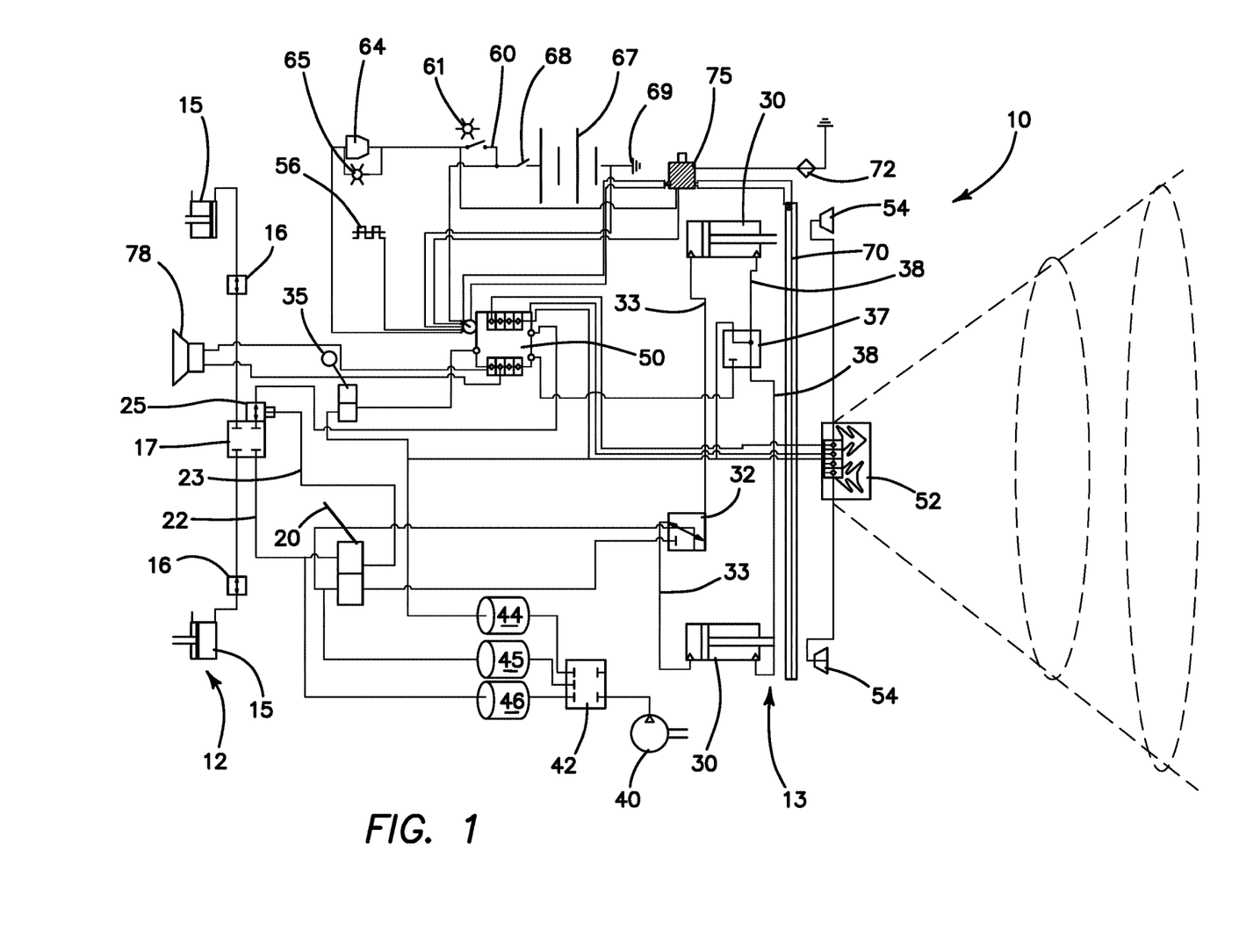
FIG. 1 is a schematic diagram of an automatic braking systems according to one example of the present invention.

Referring to FIG. 1, a schematic diagram of a braking system 10 is shown, including front brakes 12 and rear brakes 13. Both the front brakes 12 and the rear brakes 13 can be engaged using a service brake system, while the rear brakes 13 can also be engaged using a spring brake system, each of which will be described in more detail below.

The front brakes 12 include front brake chambers 15 that are pneumatically connected to ABS modulator valves 16, which are connected in turn to a front service relay valve 17. A brake pedal 20, forming part of the service brake system, is connected to the relay valve 17 through a pneumatic connection 22. An electrical connection 23 also links the brake pedal 20 to the relay valve 17 via a double check valve 25.

The brake pedal 20 includes a valve, so that application of the brake pedal 20 causes pneumatic pressure to be transferred to the relay valve 17, which in turn is transferred to the brake chambers 15 via the ABS modulator 16.

The front brakes 12 are disengaged by default. When the brake pedal 20 is applied, the transfer of pneumatic pressure causes the brake chambers 15 to be activated, engaging the front brakes 12 and applying a braking force to front wheels of the vehicle on which the system 10 is installed.

The rear brakes 13 include rear brake chambers 30. The service brake system includes a rear service relay valve 32 that is connected to the rear brake chambers 30 by pneumatic connections 33. As for the front brakes 12, application of the brake pedal 20 causes pneumatic pressure to be transferred to the relay valve 32, which in turn is transferred to the brake chambers 30. This causes the brake chambers 30 to be activated, engaging the rear brakes 13 and applying a braking force to rear wheels of the vehicle. Also, similarly to the front brakes 12, the service brake system on its own does not engage the rear brakes 13 by default.

The rear brakes 13 also include a spring brake system, which may also be referred to as a parking brake or emergency brake. The spring brake system is activated using a spring brake actuator 35 that is connected to a spring relay valve 37. The rear brake chambers 30 are connected to the spring relay valve 37 by pneumatic connections 38.

The spring brake system causes the rear brakes 13 to be biased towards an engaged state, applying a braking force to the rear wheels due to a force from a spring activating the rear brake chambers 30. When the spring brake is to be released, the actuator 35 is moved, causing pneumatic pressure to be transferred to the rear brake chambers 30, thereby overcoming the force of the spring and releasing the spring brake.

The spring brake system is designed as a failsafe system. In the event of a system failure, such as an air leak resulting in a lack of air pressure, the spring brake system causes the rear brakes 13 to be applied due to the spring force and the absence of the pneumatic pressure required to disengage the rear brake chambers 30.

The pneumatic system is powered by an engine driven air compressor 40 that feeds pressurised air to a protection valve 42, which in turn feeds a spring brake air reservoir 44, a rear service air reservoir 45 and a front service air reservoir 46.

While the braking system 10 is a pneumatic, or air operated system, it will be appreciated that the present invention can be applied to other types of braking systems, such as hydraulic, electrical or other systems, all of which are considered to fall within the scope of the invention.

The braking system 10 includes a control unit 50 housing a micro-processor that allows an automatic application of a braking force when sensors detect particular conditions. The control unit 50 receives signals from sensors that include a radar sensor 52, one or more ultrasound sensors 54 and a speed sensor 56. The speed sensor 56 may be one or more of a GPS sensor, gear box speed sensor, CAN bus signal or any other means of sensing vehicle speed as familiar to those skilled in the art.

The system 10 includes a switch 60 located inside a cabin of the vehicle, which incorporates a warning light 61 to indicate whether or not the system 10 is activated. A buzzer 64 is also located inside the cabin, which may also include various warning lights 65, such as fault warnings, diagnostic indicator lights and the like.

The system 10 is powered by a battery 67, such as the 24 V vehicle battery, and includes a fuse 68 and earth terminal 69. Other inputs to the control unit 50 include a contact sensor 70 and a proximity sensor 72 that are connected to the control unit 50 via a junction box and relay 75. The control unit 50 also includes an electrical output to an alarm/alert system in the form of a horn 78.

The radar sensor 52 detects objects that may potentially impact the vehicle, such as other vehicles moving toward the radar sensor 52. Once an approaching object is identified by the radar sensor 52, the system 10 continues to monitor the object in terms of both the distance of the object from the vehicle and the speed at which it is approaching. Other relevant parameters may also be calculated as necessary, such as but not limited to rates of change of variables and relative direction of movement of the object.

Alternative means of determining such data other than the use of radar may also be known to those skilled in the art, such as laser based sensors, and may be used in place of the radar sensor 52. An alternative embodiment of the invention also includes two or more different means of long distance detection. For example, the system may include a Doppler radar system as well as a stereo camera module.

The data from the radar sensor 52 is processed by the control unit 50 using software algorithms to compute the relative speed and closing distance of an imminent impact object. If a probable impact is detected, the horn 78 is sounded as an alarm system to alert workers close to the vehicle and/or the operator of the vehicle of the probable impact. This allows a warning prior to the contact sensor 70 being activated if an actual impact does occur. In alternative embodiments of the invention, different or additional warning devices to the horn 78 may be used, such as flashing lights.

In the presently described example, the braking system 10 can typically detect an approaching vehicle accurately from about 25 metres away using the radar sensor 52, but improvements/variations in sensors, software algorithms and the like may provide an increased range. As soon as a potential impact is detected, the software in the system 10 continues to compute the speed and distance of the object, looking for both deceleration and/or a change in trajectory away from the sensor 52. The system 10 continues to monitor to a first decision point (or threshold value), where if there is no significant change in either state, a signal is sent to activate the alarm system.

In the case of the braking system 10 being used on a lane closure vehicle, sometimes these vehicles are left unattended as a lane block, for example, while workers concentrate on road repairs. Therefore, the braking system 10 will give warning to the workers prior to the impact occurring, thereby providing additional time for the workers-to assess the danger and move out of the way or take other precautionary action. This is advantageous, as more time is provided when compared to only being aware of a danger after an impact has already occurred.

If an impact occurs, the contact sensor 70 is activated and a signal is sent to the control unit 50. The front brakes 12 are then engaged using the service brake system, by a connection between the control unit 50 and the double check valve 25 and front service relay valve 17, resulting in a pneumatic force being transferred to the front brake cylinders 15. The rear brakes 13 are also engaged using the spring brake system, by a connection between the control unit 50 and the spring relay valve 37, resulting in a release of pneumatic pressure from the rear brake cylinders 30 so that the spring force engages the rear brakes 13.

In the presently described example, input from the radar sensor 52 may also be used to engage the brakes, prior to the contact sensor 70 being activated. For example, the alarm system may be activated due to a potential impact, and if there is still no significant change in trajectory of an approaching object, a second decision point (or threshold value) may be reached whereby the brakes are engaged. The control unit 50 may therefore be configured to engage the brakes, even though the contact sensor 70 has not yet been activated (i.e. before impact).

In the presently described example, the speed of the vehicle is known from the speed sensor 56 and the control unit 50 uses this information to automatically disarm the system 10 at a predetermined speed. This reduces the risk of an unrequested brake application when the vehicle is travelling at speed, such as to or from a work zone. It would be appreciated that, a fault in the system 10 causing the brakes to be applied without warning when travelling at 100 km/h on a freeway would be very dangerous/damaging. The presently described system ensures this situation does not occur. Due to the layout of the brake system 10 as described, completely deactivating the automatic brake system 10 as described, completely deactivating the automatic brake system 10 still allows the brakes to function in a regular manner for driving the vehicle.

The layout of the system 10 also ensures that once the system 10 engages the brakes, they can't be accidentally disengaged. For example, if an impact is sufficient to damage the vehicle's electrical system and the control signals for the braking system 10 fail, at least the spring brake will still remain engaged. Similarly, even if the brakes are engaged automatically, and the service brake system subsequently fails (for example if the impact damages the pneumatic system and an air leak allows the brakes to release), the spring brake will remain engaged.

As described previously, the braking system 10 includes a manually operated parking brake lever (spring brake actuator 35) and a manually operated activation switch 60. To further aid in preventing the inadvertent release of the brakes after an impact, the braking system 10 is configured so that after the system 10 engages the brakes automatically, such as due to a signal from the contact sensor 70, the brakes will not be disengaged until after a specific deactivating procedure has been completed.

This deactivating procedure may include moving the actuator 35 to an engaged position and then returning it to a disengaged position. Alternatively, the brakes may be disengaged after the activation switch 60 has been moved to a deactivated position. Some embodiments may require that both the activation switch 60 is deactivated while the actuator 35 is cycled through park (i.e. moving actuator to the engaged position back to the disengaged position). In some embodiments time delays may also be implemented, such as only disengaging the brakes after the actuator 35 has been cycled through park (i.e. put in the engaged position and returned to the disengaged position) over a set time, moving the activation switch 60 to the deactivated position for a set time, or moving the actuator 35 to an engaged position for a set time before then disengaging. The set time may be any suitable value, such as, but not limited to, 2 seconds.

In the case of the braking system 10 being used on a lane closure vehicle, such a vehicle will generally include an attenuator or cushion on which the contact sensor 70 is mounted and which is designed to absorb an impact. This attenuator or cushion may be raised to a stowed position when the vehicle is being driven at speed, for example. When it is raised to its stowed position, the system 10 may detect this using the proximity sensor 72 may be configured to automatically power down accordingly. This may be preferable than only taking the contact sensor 70 out of circuit but leaving the system 10 activated as it reduces the possibility of an inadvertent brake application while the attenuator/cushion is stowed. Similarly, when the proximity sensor detects the attenuator/cushion to be the deployed state, the system may be configured to power up.

On board diagnostics (not shown) monitor all components, supply voltages and pressures. If any component/system failure or fault is detected, the control unit 50 chooses an appropriate action. This may include activating a "limp home mode" or disarming the system 10 for serious faults. It may additionally or alternatively include transmitting a warning to the operator via the in-cab warning lights 65 and/or buzzer 64 specifying the nature of the fault. For example, a minor malfunction of a sensor when there is a backup in place may only require notifying the operator, but may still allow the system 10 to function safely.

Furthermore, data from the ultrasound sensor 54 and/or the radar sensor 52 may be used individually or combined to aid reversing and manoeuvring operations. For example, when reversing the vehicle, if a person or object is detected behind the vehicle the system 10 can engage the brakes as previously described to prevent an impact. This is particularly advantageous as it protects workers operating close to vehicles. This is applicable not only to lane closure vehicles, but also other road maintenance heavy vehicles and plant equipment. One particular application may be to protect workers who are required to operate in very close proximity to road laying vehicles that dispense aggregate onto a road surface.

In one example, when the vehicle is reversing (or otherwise manoeuvring) the mass and speed of the vehicle (or other parameters) may be taken into account when automatically applying the brakes. This allows the system 10 to modulate/control both the speed and pressure required to stop the vehicle within a set distance from the worker or obstacle that has been detected. For example, it may be desired for the vehicle to stop within one metre after detecting an obstacle. Application of the brakes can be modulated/controlled to enable this to happen, only resulting in extremely sudden or violent braking if absolutely necessary. Such controlled braking can help to protect any sensitive cargo and occupants.

In another example, when the vehicle is reversing (or otherwise manoeuvring) the mass and speed of the vehicle (or other parameters) may be taken into account to delay the brake application. The combination of sensors can account for the variation in distance along with the speed and/or mass of the vehicle to arrive at a decision point (or threshold value) where the obstacle or person is at very short distance from the vehicle rear, yet the vehicle continues to move. The brakes may be applied for a few seconds or a warning signal given, providing valuable time for either the person to move or allowing sufficient time for the driver to look at what caused the application, prior to the vehicle being stopped completely by the braking system 10.

In an air suspension vehicle the mass can be calculated from the air pressure required to support the frame at a fixed height. For a mechanical suspension vehicle an electronic height sensor can be fitted to measure the spring deflection. This data can be combined with that from the speed sensor 56 as described previously. PWM (Pulse Width Modulation) can then be used to adjust the amount of brake force required to stop the vehicle before contact with any obstacle or person.

Figure 2:
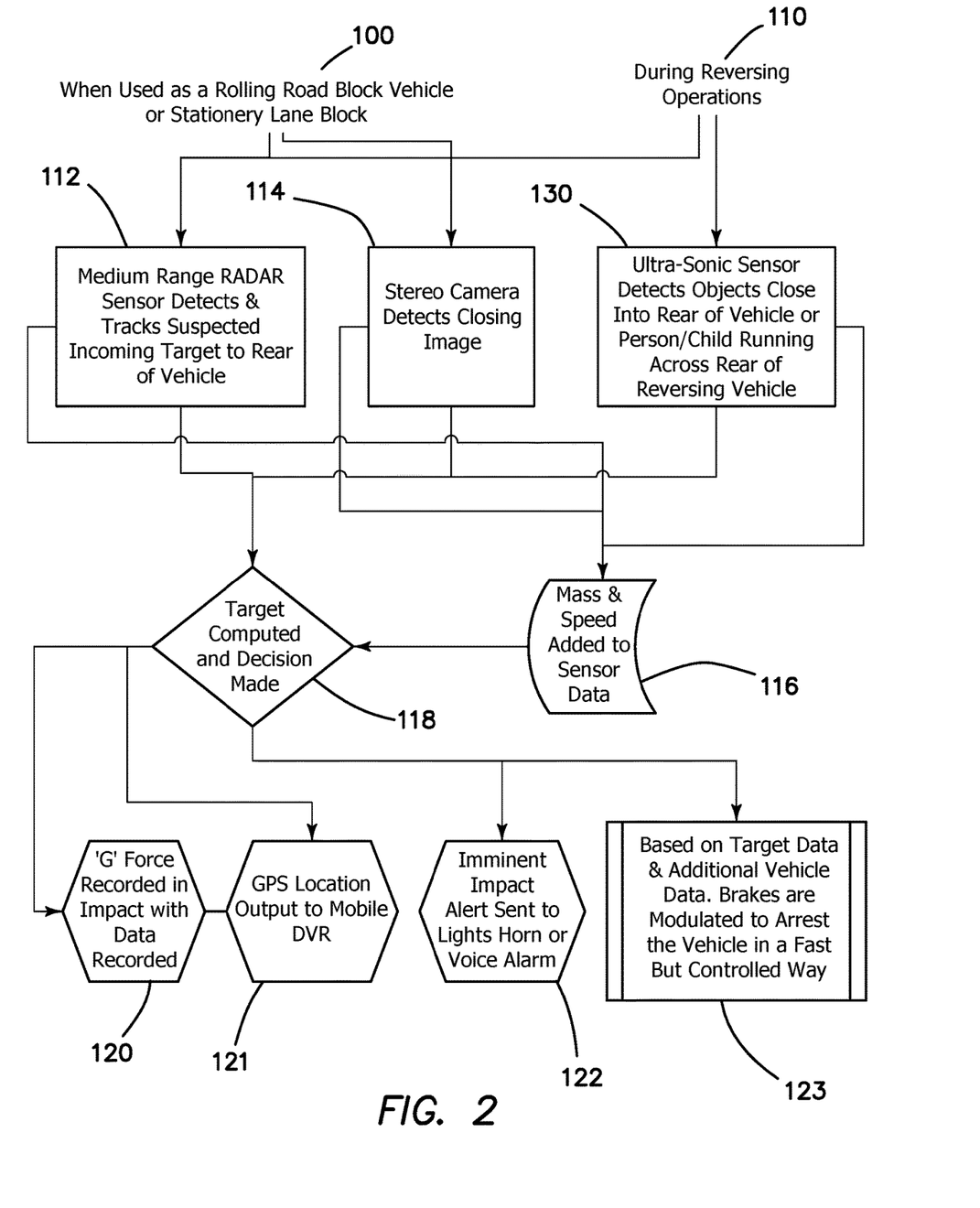
FIG. 2 is a flow chart of a decision process as implemented by the control unit according to one example of the present invention.

FIG. 2 shows an example of a decision process as may be implemented by the control unit 50. Different procedures are used depending on whether the vehicle is being used as a road block 100 or during reversing operations 110.

During use as a road block 100, at least the radar sensor 52 and a stereo camera (not included in the embodiment of FIG. 1) are used at steps 112 and 114 to detect and track a suspected incoming target to the rear of the vehicle. Data from these sensors are combined with mass and speed information 116 to calculate parameters, such as time to impact and expected impact magnitude. Decisions are made at 118 based on these parameters and can result in signals being sent to record forces during an impact at step 120, record location at step 121, activate the horn 78 or other alert systems at step 122 to activate and modulate the brakes at step 123.

A similar process is applied during reversing operations 110, where the ultrasound sensor 54 and radar sensor 52 are used at steps 130 and 112 to detect people or objects near the rear of the vehicle. Data from these sensors are combined with mass and speed information 116 to calculate parameters, such as time to impact and expected impact magnitude. Decisions are made at 118 based on these parameters and can result in signals being sent to record forces during an impact at step 120, record location at step 121, activate the horn 78 or other alert systems at step 122 and to activate and modulate the brakes at step 123.

Figures 3A, 3B:
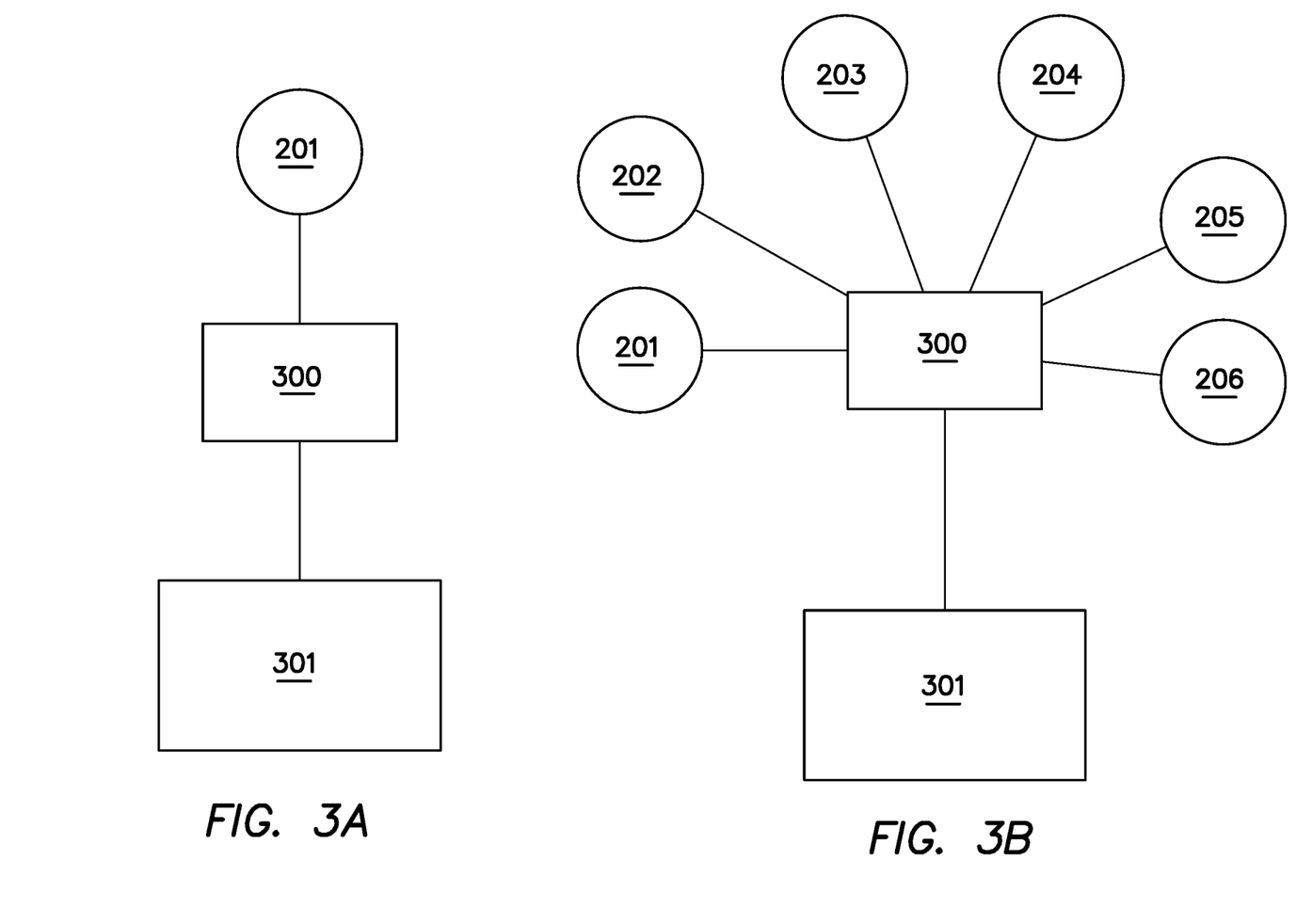
FIGS. 3a and 3b show basic overview schematics of some examples of automatic braking systems according to the invention.

FIGS. 3a and 3b show basic overview schematics of two examples of the automatic braking system. As previously described vehicle brakes (301) are controlled by the control unit (300) which receives and processes information from sensors (201-205). Contact sensor (201) providing impact information, remote sensors and near-range sensors (202 and 203) providing potential/imminent impact information, speed sensor (204) providing host vehicle speed information, mass sensor (205) providing host vehicle mass information, and proximity sensor (206) providing attenuator position information.

As previously noted, it will be appreciated that the automatic braking system as described herein may be applied to a range of vehicle types. One particular example is garbage trucks, where line of sight behind the vehicle when reversing is often obstructed. In these and other variations the system may further include an emergency stop button connected to the control unit and made easily accessible within the cab of the vehicle. Activation of the emergency stop button would immediately activate the brakes of the vehicle. Also, in some examples, such as when adapted for use in garbage trucks, it will be appreciated that the contact sensor may not be required or may be difficult to implement (e.g. due to the loading area of at the rear of the garbage truck). In such instances, the system may rely primarily on the remote and/or near range sensors to detect potential impacts, such as, for example, with pedestrians moving about behind the vehicle.

It will also be appreciated in further forms, the system may be further configured such that the control unit may override control of the vehicle drive speed, for example via control of the throttle or otherwise. This may be advantageous in situations where the driver may have been injured during impact, and although the brakes have been applied, the driver is still unintentionally activating the accelerator of the vehicle.

It will also be appreciated that installation/fitting of the automatic braking systems as described herein may be staged. For example, a basic form including contact sensor and control unit may be fitted initially, with subsequent addition of remote/nearrange/speed sensors being installed/fitted separately subsequently. As such, it will be appreciated that different aspects of the system may be provided as add-on retrofit kits.

Many modifications will be apparent to those skilled in the art without departing from the scope of the present invention.

| Parts list: | |
|---|---|
| 10 | Brake system |
| 12 | Front brake system |
| 13 | Rear brake system |
| 15 | Front brake chambers |
| 16 | ABS modulator valve |
| 17 | Front service relay valve |
| 20 | Brake pedal |
| 22 | Pneumatic connection |
| 23 | Electrical connection |
| 25 | Double check valve |
| 30 | Rear brake chambers |
| 32 | Rear service relay valve |
| 33 | Pneumatic connection |
| 35 | Spring brake actuator |
| 37 | Spring relay valve |
| 38 | Pneumatic connection |
| 40 | Air compressor |
| 42 | Protection valve 7 |
| 44 | Spring brake air reservoir |
| 45 | Rear service air reservoir |
| 46 | Front service air reservoir |
| 50 | Control unit |
| 52 | Radar sensor |
| 54 | Ultrasound sensor |
| 56 | Speed sensor |
| 60 | In-cab switch |
| 61 | Warning light |
| 64 | In-cab buzzer |
| 65 | Warning lights |
| 67 | Batteries |
| 68 | Fuse |
| 69 | Earth |
| 70 | Contact strip |
| 72 | Proximity sensor |
| 75 | Junction box and relay |
| 78 | Horn |

The claims defining the invention are as follows:

1. An automatic braking system including:
a control unit for controlling at least some of brakes of a vehicle;
a contact sensor for detecting an impact; and
a mass sensor for detecting a mass of the vehicle,
wherein engagement of the at least some of the brakes is modulated based on the vehicle mass, and
wherein, the control unit is configured to engage the at least some of the brakes when the impact is detected.

2. The automatic braking system according to claim 1, wherein the automatic braking system is configured to be deactivated under certain conditions.

3. The automatic braking system according to claim 2, wherein the contact sensor is configured to be secured to an impact attenuator that is movable between a stowed position and a deployed position, and wherein the automatic braking system is deactivated when the impact attenuator is in the stowed position.

4. The automatic braking system as claimed in claim 3, further including a proximity sensor to detect movement of the impact attenuator between the stowed position and the deployed position.

5. The automatic braking system as claimed in claim 3, wherein the impact attenuator is mounted to a trailer coupled to the vehicle.

6. The automatic braking system according to claim 1, wherein the contact sensor includes any one or a combination of a carbon contact strip, a pressure sensor and/or a gyroscopic accelerometer.

7. The automatic braking system as claimed in claim 1, further including a speed sensor for detecting a speed of the vehicle.

8. The braking system as claimed in 7, wherein the automatic braking system is deactivated when the speed of the vehicle is above a predefined value.

9. The automatic braking system according to claim 1, further including a remote sensor for detecting one or more parameters associated with determining a potential for impact with an object.

10. The automatic braking system according to claim 9, wherein the remote sensor includes any one or a combination of a radar sensor, a stereo camera module, a laser sensor, a gyroscopic accelerometer and/or an ultrasound sensor.

11. The automatic braking system according to claim 9, wherein the control unit controls the at least some of the brakes based on one or more signals received from the remote sensor and/or the contact sensor.

12. The automatic braking system as claimed in claim 9, wherein the control unit is configured to engage the at least some of the brakes when the potential for impact is above a threshold value.

13. The automatic braking system as claimed in claim 1, further including an alert system.

14. The automatic braking system as claimed in claim 13, wherein the alert system includes an audible alarm and/or warning lights.

15. The automatic braking system as claimed in claim 13, wherein the alert system is activated when a probability of the impact is above a threshold value.

16. The automatic braking system according to claim 15, wherein the alert system includes any one or a combination of an audible alarm, integration with a vehicle horn and/or flashing lights.

17. The automatic braking system according to claim 1, further including a near-range sensor for detecting a nearby object.

18. The automatic braking system according to claim 17, wherein the near-range sensor includes any one or a combination of an ultrasound sensor, an infrared sensor, an inductive sensor, a laser sensor, an electromagnetic sensor and/or a proximity sensor.

19. The automatic braking system according to claim 18, wherein the control unit is configured to engage the at least some of the brakes of the vehicle when an object is within a predetermined distance of the near-range sensor.

20. The automatic braking system according to claim 1, wherein the automatic braking system is configured to be connected to a manually operated parking brake lever of the vehicle, and wherein the automatic braking system is configured such that after the automatic braking system has engaged the at least some of the brakes of the vehicle, the at least some of the brakes are not capable of being disengaged until the manually operated parking brake lever has been cycled.

21. The automatic braking system according to claim 20, wherein cycling the manually operated parking brake lever includes moving the manually operated parking brake lever to an engaged position for at least a pre-determined time period and then returning the manually operated parking brake lever to a disengaged position.

22. The automatic braking system according to claim 1, wherein the automatic braking system is configured to be connected to a manually operated activation switch, and wherein the automatic braking system is configured such that after the automatic braking system has engaged the at least some of the brakes of the vehicle, the at least some of the brakes are not capable of being disengaged until the manually operated activation switch has been toggled.

23. The vehicle as claimed in claim 1, wherein the vehicle includes a first brake that is biased towards a disengaged state and a second brake that is biased towards an engaged state, wherein the first brake and the second brake are engaged by the automatic braking system when the impact is detected.

24. The vehicle according to claim 23, wherein the second brake is a parking brake.

25. The vehicle as claimed in claim 24, wherein the first brake comprises a pneumatically-operated brake having a first pneumatic cylinder connected to a pressurised air supply whereby the supply of the pressurised air activates the first brake, and the second brake comprises a spring-actuated brake having a second pneumatic cylinder connected to a pressurised air supply whereby the supply of the pressurised air opposes the spring and deactivates the second brake, wherein a first valve is connected to the pressurised air supply for the first brake and a second valve is connected to the pressurised air supply for the second brake, the system being configured to engage the at least some of the brakes by issuing a signal to the first valve and to the second valve, to thereby supply the pressurised air to the first pneumatic cylinder and exhaust air from the second pneumatic cylinder.

* * * * *